(12) United States Patent
Matsumoto

(10) Patent No.: US 11,047,805 B2
(45) Date of Patent: Jun. 29, 2021

(54) INSPECTION DEVICE AND DETECTOR

(71) Applicant: Hitachi High-Tech Corporation, Tokyo (JP)

(72) Inventor: Shunichi Matsumoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 397 days.

(21) Appl. No.: 16/066,208

(22) PCT Filed: Jan. 14, 2016

(86) PCT No.: PCT/JP2016/050964
§ 371 (c)(1),
(2) Date: Jun. 26, 2018

(87) PCT Pub. No.: WO2017/122320
PCT Pub. Date: Jul. 20, 2017

(65) Prior Publication Data
US 2020/0271594 A1 Aug. 27, 2020

(51) Int. Cl.
*G01N 21/95* (2006.01)
(52) U.S. Cl.
CPC ... *G01N 21/9501* (2013.01); *G01N 2201/063* (2013.01); *G01N 2201/06126* (2013.01)
(58) Field of Classification Search
CPC .............................................. G01N 221/9501
USPC ......................................................... 356/237.2
See application file for complete search history.

(56) References Cited

U.S. PATENT DOCUMENTS

| 7,636,158 B1 * | 12/2009 | Pawluczyk ............... G01J 3/02 356/326 |
| 2012/0092484 A1 * | 4/2012 | Taniguchi .......... G01N 21/9501 348/87 |
| 2012/0194807 A1 | 8/2012 | Maruyama et al. |

(Continued)

FOREIGN PATENT DOCUMENTS

| JP | 2003-114195 A | 4/2003 |
| JP | 2011-7693 A | 1/2011 |

(Continued)

OTHER PUBLICATIONS

International Search Report (PCT/ISA/210) issued in PCT Application No. PCT/JP2016/050964 dated Mar. 29, 2016 with English translation (five (5) pages).

(Continued)

*Primary Examiner* — Tarifur R Chowdhury
*Assistant Examiner* — Omar H Nixon
(74) *Attorney, Agent, or Firm* — Crowell & Moring, LLP; Cameron Beddard

(57) ABSTRACT

An inspection device has an illuminating optical system for forming an illuminated area on a sample, a converging optical system for converging the light from the sample, and a detector for detecting the light converged by the converging optical system. The converging optical system includes an image forming element that includes a lens group that has divided apertures and is configured so as to form a plurality of images. The detector detects a signal for the images formed by the image forming element. The detector has a plurality of partitions disposed in a matrix, the partitions include first and second pixels, and the images are projected onto the partitions.

13 Claims, 9 Drawing Sheets

(56) References Cited

U.S. PATENT DOCUMENTS

| | | | | |
|---|---|---|---|---|
| 2013/0301042 A1* | 11/2013 | Urano | ............... | G01N 21/956 |
| | | | | 356/237.5 |
| 2013/0321798 A1* | 12/2013 | Urano | ............... | G01N 21/956 |
| | | | | 356/237.5 |
| 2015/0116702 A1 | 4/2015 | Matsumoto et al. | | |
| 2015/0146200 A1* | 5/2015 | Honda | ............... | G01N 21/8806 |
| | | | | 356/237.5 |

FOREIGN PATENT DOCUMENTS

| | | |
|---|---|---|
| JP | 2011-69659 A | 4/2011 |
| JP | 2013-231631 A | 11/2013 |
| JP | 2013-234966 A | 11/2013 |
| JP | 2014-167462 A | 9/2014 |

OTHER PUBLICATIONS

Japanese-language Written Opinion (PCT/ISA/237) issued in PCT Application No. PCT/JP2016/050964 dated Mar. 29, 2016 (five (5) pages).

\* cited by examiner

INSPECTION DEVICE AND DETECTOR

TECHNICAL FIELD

The present invention relates to an inspection device and a detector. For example, the present invention relates to an inspection device for inspecting a sample for minute defects on a surface thereof.

BACKGROUND ART

In production lines for semiconductor substrate, membrane substrate and the like, the semiconductor substrate, membrane substrate and the like are inspected for defects on the surfaces thereof for the purposes of sustaining or increasing product yield. Techniques used for defect inspection are disclosed in Japanese Unexamined Patent Application Publication No. 2011-069659 (Patent Literature 1), Japanese Unexamined Patent Application Publication No. 2013-234966 (Patent Literature 2), and the like. According to these techniques for detecting the minute defects on the substrate, a focused laser beam is applied onto the sample surface while weak light scattered from the defect is converged and detected. It is known that the quantity of scattered light I generated in conjunction with the illumination of the defect with the laser light has a relation of $I \propto d^6$, provided that d denotes a size of the defect. Therefore, if the size of a defect to be detected is decreased to ½, the quantity of scattered light from the defect (namely, defect detection signal) is notably decreased to 1/64.

As a method for increasing the scattered light from the defect, shortening the wavelength of illumination light, increasing laser output, reducing a laser illuminated area on the sample and the like are known. Provided that $\lambda$ denotes the wavelength of illumination light, there is a relation of $I \propto d^{-4}$ between $\lambda$ and the scattered light intensity I. Namely, the quantity of scattered light from the defect (namely, defect detection signal) can be increased by shortening the wavelength of illumination light. The methods of increasing the laser output and reducing the laser illuminated area are both effective to increase illumination energy on the defect and to increase the defect detection signal.

A photon counting method is known as a method for detecting a weak light. The following method is known as an example of the photon counting method. In a detector including a plurality of APD (Avalanche Photo Diode) elements arranged in a two-dimensional array, the sum of pulse currents generated upon incidence of photon on the individual elements is calculated. This detector is referred to as Si-PM (Silicon Photomultiplier), PPD (Pixelated Photon Detector), Multi-Pixel Photon Counter or the like. In contrast to conventional photon counting method employing a photomultiplier tube or an APD element including a single element, this method can make a measurement of light quantity by calculating the sum of pulse currents from the plural APD elements even when plural photons become incident on the detector within a very short time.

CITATION LIST

Patent Literature

Patent Literature 1: Japanese Unexamined Patent Application Publication No. 2011-069659
Patent Literature 2: Japanese Unexamined Patent Application Publication No. 2013-234966

SUMMARY OF INVENTION

Technical Problem

What is required of the defect inspection used in a manufacturing process for semiconductor or the like includes: (1) capability of detecting minute defects; (2) capability of making a high-precision measurement of the size of detected defect; (3) capability of achieving practically consistent inspection results regarding the number, position, size, type and the like of detected defects when identical test samples are inspected; and (4) capability of inspecting a large number of samples in a given amount of time.

It is therefore required to detect all the scattered light from the defect, or to comprehensively enlarge an optical detection aperture such that all the information from the defect can be acquired. Specifically, it is important to position an aperture of a detecting optical system relative to a sample surface in a manner to permit the detecting optical system to capture the largest possible number of light beams scattered from a defect at every elevation angle and azimuth angle. The techniques disclosed in Patent Literatures 1 and 2 adopt a method where a plurality of detecting optical systems are arranged to comprehensively increase the optical detection aperture.

In a case where, the wavelength of illumination light is shortened or the illumination energy is increased as a measure for increasing the defect detection signal, there is a possibility of producing a new problem that the measure may cause damage to samples. In order to increase the signal from the defect without damaging the samples, Patent Literatures 1 and 2 adopt a method where a laser illuminated area on the sample is formed in a linear shape while the scattered lights from the defect are passed through an image forming optical system to be detected in parallel by a detector including a plurality of pixels.

However, these prior arts suffer the following problems. According to Patent Literature 1, an image forming optical system employs a diffraction grating such that the image forming optical system can be installed in correspondence to any elevation angle and any azimuth angle. This method may suffer difficulty in fabrication of the detecting optical system and in securing the stability thereof. For simplicity of the detecting optical system, Patent Literature 2 adopts a configuration where a plurality of high-NA detecting optical systems which varies only detection elevation angle while fixing detection azimuth angle. However, this method may fall short in capturing the scattered light emitted from the defect in a direction at the detection azimuth angle.

In this connection, an object of the present invention is to solve the problems of the prior art and to provide a technique enabling the detection of minute defects with high speed and sensitivities.

Solution to Problem

For achieving the above object, the present invention adopts, for example, configurations set forth in the appended claims. While the description contains a plurality of means for achieving the above object, an example thereof is an inspection device including: an illuminating optical system for forming an illuminated area on a sample; a converging optical system for converging light from the sample; and a detector for detecting light converged by the converging optical system, wherein the converging optical system includes an image forming element including a lens group that has divided apertures and is configured to form a plurality of images; the detector detects a signal of an image formed by the image forming element, and the detector includes a plurality of partitions arranged in matrix, the partition which includes a first pixel and a second pixel and on which the image is projected.

Advantageous Effects of Invention

The present invention permits the minute defects on the sample surface with high speed and high sensitivity. The above-described problems, configurations and effects will become apparent from the following description of embodiments.

DESCRIPTION OF EMBODIMENTS (1) General Outline

The embodiments of the present invention will hereinbelow be described with reference to the accompanying drawings. It is noted that the present invention is not limited to the following embodiments but includes a variety of changes and modifications. The following embodiments are detailed description of the present invention for clarity but the present invention is not necessarily limited to what includes all the components described. Further, a portion of the structure of one embodiment can be replaced with a structure of another embodiment. Further, a structure of one embodiment permits addition of a structure of another embodiment. Furthermore, a portion of the structure of each embodiment is deletable or permits addition of or replacement with another structure.

In the following embodiments, the description is made on a case where the present invention is applied to a surface inspection device used for defect inspection performed in the manufacturing process for semiconductor or the like. The use of the surface inspection devices provides for: (1) detection of minute defects; (2) high-precision size measurement of detected defect; (3) non-destructive inspection (including non-alteration of sample) of sample; (4) acquisition of practically consistent inspection results regarding the number, position, size and type of detected defects; (5) inspection of a large number of samples in a given amount of time; and the like.

(2) First Embodiment (2-1) System Structure

Figure 1:
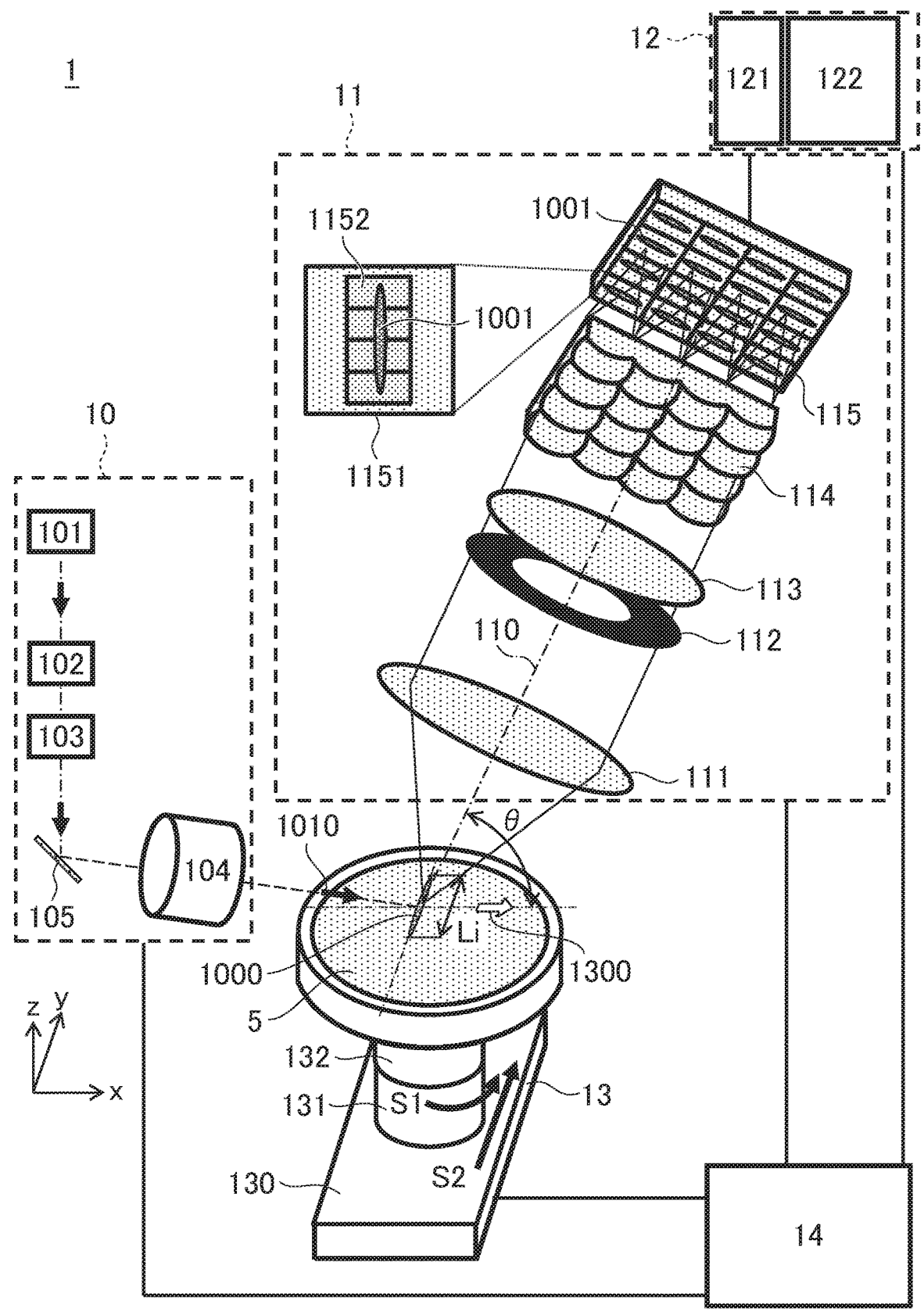
FIG. 1 is a block diagram showing a basic structure of an optical system of a surface inspection device according to a first embodiment.

FIG. 1 shows a basic structure of an optical system constituting a surface inspection device 1 according to the present embodiment. The surface inspection device 1 includes: an illuminating optical system unit 10; a detecting optical system unit 11; a signal processing unit 12; a stage unit 13; and a general control unit 14.

The illuminating optical system unit 10 includes: a light source 101; a polarization state controller 102; a beam shaping unit 103; a thin-line converging optical system 104; and a mirror 105. An illumination light emitted from the light source 101 is transmitted through the polarization state controller 102 and the beam shaping unit 103 before an optical path thereof is changed by the mirror 105. Thus, the illumination light is guided into the thin-line converging optical system 104.

The polarization state controller 102 includes: a polarization element (half-wavelength plate; quarter wavelength plate or the like); and an unillustrated driving unit rotatable about an optical axis of the illuminating optical system. The polarization state controller adjusts the polarization of the illumination light for illuminating a wafer 5 placed on the stage unit 13. The beam shaping unit 103 is an optical unit for forming a thin-line illumination light and essentially includes a beam expander, an anamorphic prism or the like.

The thin-line converging optical system 104 essentially includes a cylindrical lens and the like. The system illuminates the surface of the wafer 5 with an illumination light shaped into a thin-line. In this embodiment, an area illuminated with this illumination light is referred to as "thin-line illuminated area 1000". In FIG. 1, a width direction of the thin-line illuminated area 1000 (a direction substantially perpendicular to a longitudinal direction of the thin-line illuminated area 1000 and represented by an arrow 1300) is defined as x-direction, while the longitudinal direction of the thin-line illuminated area 1000 is defined as y-direction. Illuminating the surface of the wafer 5 with the thin converged illumination light (hereinafter, also referred to as "thin-line illumination light") is for the purposes of increasing the intensity of illumination (density of lighting energy) on the wafer surface and improving inspection throughput. In the figure, an advancing direction of the thin-line illumination light is represented by an arrow 1010.

The light source 101 employed by the embodiment is preferably a high-coherent light source (such as a laser light source) which emits a linear polarized light and has an excellent light-harvesting property. Shortening of the wavelength of illumination light is effective for increasing the scattered light from the defect present in the thin-line illuminated area. Hence, a UV (Ultra Violet) laser is used as the light source 101. The light source 101 may employ, for example, any one of YAG (Yttrium Aluminum Garnet)-THG (Third Harmonic Generation) laser having an emission wavelength of 355 nm, YAG-FHG (Fourth Harmonic Generation) laser having an emission wavelength of 266 nm, solid-state laser having an emission wavelength of 213 nm, 199 nm, or 193 nm equivalent to a sum frequency mixing fundamental waves of YAG-FHG and YAG lasers. The scattered light from the wafer 5 is detected by the detecting optical system unit 11.

The detecting optical system unit 11 includes: an objective lens 111; an aperture control filter 112; a polarization filter 113; an imaging lens 114; and a parallel photon counting sensor 115. In this embodiment, an optical axis 110 of the detecting optical system unit 11 is so arranged as not to perpendicularly intersect the thin-line illuminated area 1000 (namely, oriented at an elevation angle θ). While the following description is made on a case where one detecting optical system unit 11 is provided, a plurality of detecting optical system units 11 having different elevation angles θ1, θ2 . . . , θi and different azimuth angles ø1, ø2 . . . , øj may be provided.

The light scattered from the surface of the wafer 5 (thin-line illuminated area 1000) by applying the thin-line illumination light is focused into an image on a surface of the parallel photon counting sensor 115 by means of the objective lens 111, aperture control filter 112, polarization filter 113 and imaging lens 114. That is, an image of the thin-line illuminated area 1000 on the wafer 5 is formed on the surface of the parallel photon counting sensor 115.

The objective lens 111 has a focal length fo and outputs parallel beams by converting incident scattered light. The aperture control filter 112 acts to enhance defect detection sensitivity by blocking background scattered light (background light noise) caused by roughness and the like of a substrate surface. The polarization filter 113 includes: a polarization control element such as a polarization plate; and an unillustrated driving unit capable of rotating the element about the optical axis 110. The polarization filter 113 acts to reduce the background light noise by filtering out a particular polarization component from the detected scattered light so as to enhance the defect detection sensitivity.

The imaging lens 114 is disposed at a position (pupil position) where the light beams from the thin-line illuminated area 1000 as converted by the objective lens 111 into the parallel beams coincide with one another. The imaging lens 114 is configured as a microlens array where microlenses having a focal length fi are arranged in n rows and n columns. It is noted here that fi<fo and hence, the detecting optical system unit 11 constitutes a reducing optical system. The effect of the reducing optical system will be described with reference to FIG. 2.

The parallel photon counting sensor 115 is disposed at an image plane position of the detecting optical system unit 11. It is noted here that the parallel photon counting sensor 115 is so positioned as to substantially perpendicularly intersect the optical axis 110 of the detecting optical system unit 11. On the surface of the parallel photon counting sensor 115, n×n reduced images 1001 are formed by the microlens array constituting the imaging lens 114. That is, n×n reduced images 1001 corresponding to n×n light beams obtained by dividing the light from the light flux from the thin-line illuminated area 1000 are formed on the surface of the parallel photon counting sensor 115.

The n×n reduced images 1001 correspond to the thin-line illuminated area 1000, respectively. The parallel photon counting sensor 115 is provided with n×n blocks (partitions) 1151 in corresponding relation to these n×n reduced images 1001. The number of microlenses constituting the imaging lens 114 is the same as that of the blocks 1151.

In this embodiment, each of the blocks 1151 has substantially the same size as the microlens of the microlens array constituting the imaging lens 114. Each of the blocks 1151 essentially includes a plurality of photodetector elements 1152. The plural photodetector elements 1152 forming one block 1151 are so arranged as to equally divide the thin-line reduced image 1001 in the longitudinal direction. In FIG. 1, the block 1151 includes four photodetector elements 1152. Every one of the four photodetector elements 1152 corresponds to one channel (ch). In FIG. 1, therefore, the block 1151 includes four channels. Incidentally, one block may include any number of photodetector elements 1152 that is two or more. The photodetector element 1152 herein is also referred to as "pixel". In FIG. 1, the block 1151 includes four pixels. The block 1151 herein is also referred to as "partition".

One reduced image 1001 is detected as divided by the above-described four photodetector elements 1552. The photodetector element 1152 is a photocounting element capable of detecting a single photon (e.g., avalanche photodiode operative in Geiger mode to be described hereinlater). That is, the parallel photon counting sensor 115 is formed by arranging the blocks 1151, each including four photocounting elements, in n×n array. Therefore, the number of simultaneously detectable photons per channel is n×n. Thus, a detection dynamic range for the parallel photon counting sensor 115 is secured.

The signal processing unit 12 makes high-precision classification of various types of defects, a high-precision estimation of defect size and the like on the basis of scattering light signal photoelectrically converted by the parallel photon counting sensor 115 installed in the detecting optical system unit 11. The signal processing unit 12 includes a filtering processor 121 and a signal processor/controller unit 122 and performs a variety of processing by using these components. The contents of the processing by the individual components will be described hereinlater. The stage unit 13 includes: a translational stage 130; a rotary stage 131; and a Z-stage 132 for adjustment the height of wafer surface. The general control unit 14 controls the illuminating optical system unit 10, the detecting optical system unit 11, the signal processing unit 12, and the stage unit 13. The general control unit 14 essentially includes, for example, a computer (CPU/MPU, RAM, ROM, hard disk and the like) and implements a variety of controls by program execution.

Figure 2:
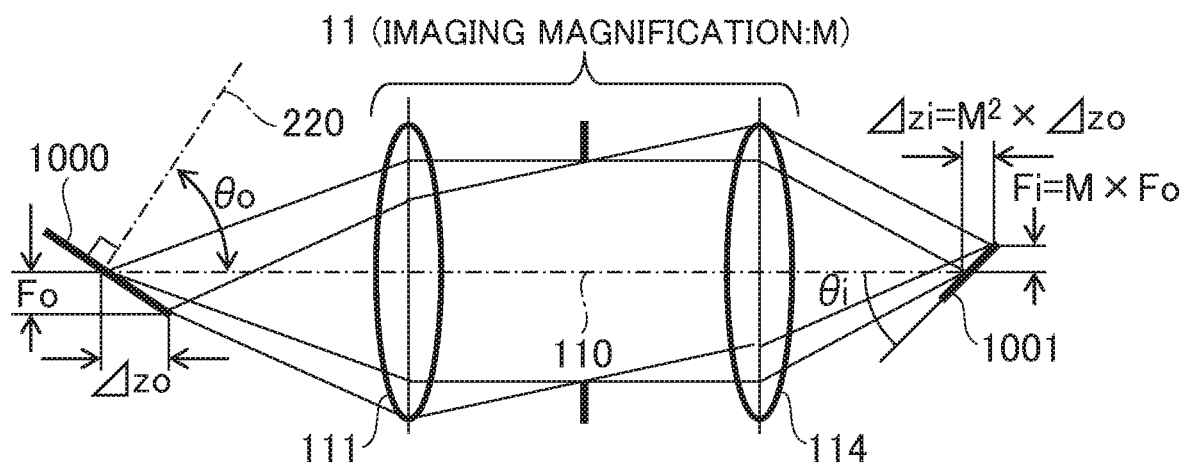
FIG. 2 is a diagram illustrating the function principle of the optical system of the surface inspection device according to the first embodiment.

(2-2) Reason for Employing Detecting Optical System Unit as Optical Reduction System The reason for employing the detecting optical system unit 11 as the optical reduction system is described with reference to FIG. 2. As described above, the optical axis 100 of the detecting optical system unit 11 is not perpendicular to the thin-line illuminated area 1000 but is inclined at an elevation angle $θ_0$. The detecting optical system unit 11 has an imaging magnification M.

The thin-line illuminated area 1000 inclined with respect to the optical axis 110 has a dimension $F_0$ in a direction perpendicular to the optical axis 110 and a dimension Δzo in a direction parallel to the optical axis 110. Since the detecting optical system unit 11 includes the objective lens 111 having the focal length fo and the imaging lens 114 having the focal length fi, the imaging magnification M is given by a formula fo/fi. The reduced image 1001 of the thin-line illuminated area 1000 formed by the detecting optical system unit 11 is also inclined with respect to the optical axis 110. It is noted here that the reduced image 1001 has a dimension Fi(=M×Fo) in the direction perpendicular to the optical axis 110 and a dimension $\Delta zi$ ($=M^2\times\Delta zo$) in the direction parallel to the optical axis 110. As seen from the above formulae, the inclination $\theta i$ of the reduced image 1001 with respect to the optical axis 110 is proportional to the square of the imaging magnification M of the detecting optical system unit 11.

If the detecting optical system unit 11 is made to operate as a magnifying system (M>1), the inclination of an image with respect to the optical axis 110 increases (namely, the inclination becomes close to the parallel to the optical axis 110), resulting in difficulty in detecting the magnified image. On the other hand, if the detecting optical system unit 11 is made to operate as the reducing optical system (M<1), the reduced image 1001 inclined with respect to the optical axis 110 rises up (namely, the inclination becomes closer to the perpendicular direction with respect to the optical axis 110), resulting in an easier detection of the reduced image 1001. Accordingly, the embodiment uses the detecting optical system unit 11 as the reducing optical system. Further, this approach facilitates the detection of the image of the thin-line illuminated area 1000, which was difficult before.

(2-3) Configuration of Each Component
(2-3-1) Parallel Photon Counting Sensor

The parallel photon counting sensor 115 is a device for converting the intensity of a weak scattered light from the minute defect defected by the detecting optical system unit 11 into an electric signal. As described above, the parallel photon counting sensor 115 includes the blocks 1151 arranged in a two-dimensional n×n array, each block including four photodetector elements 1152. The parallel photon counting sensor 115 counts up pulse currents on a per-channel basis and outputs the resultant sum. The pulse current is generated upon incidence of photon on each photodetector element 1152. The detector of this type is referred to as Si-PM (Silicon Photomultplier), PPD (Pixelated Photon Detector) or the like.

Figure 3:
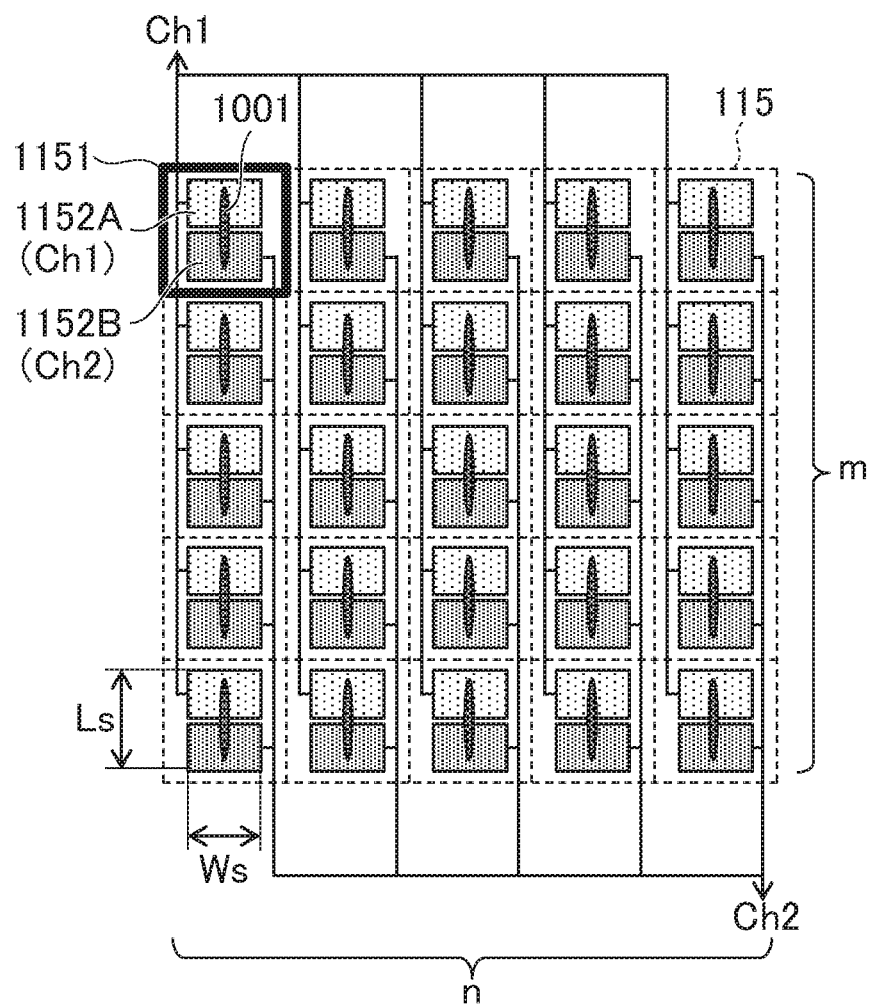
FIG. 3 is a diagram illustrating an exemplary configuration of a parallel photon counting sensor.

FIG. 3 shows a configuration of a light receiving surface of the parallel photon counting sensor 115. In FIG. 3, a single block 1151 is illustrated for simplicity as a pair of photodetector elements 1152 (1152A, 1152B). Further, FIG. 3 illustrates a more common surface configuration where the blocks 1151 are arranged in a two-dimensional m×n array. In this case, the microlenses constituting the imaging lens 114 are also arranged in the two-dimensional m×n array.

In a case where the photodetector element 1152 (1152A, 1152B) includes an avalanche photodiode, a voltage is applied to each of the photodetector elements 1152 such that the photodetector element may operate in Geiger mode (photoelectron multiplication factor of $10^5$ or more). When one photon becomes incident on one photodetector element 1152, photoelectron is generated in each diode with a probability according to a quantum efficiency of the avalanche photodiode. Subsequently, the avalanche photodiode operating in Geiger mode multiplies the photoelectron and outputs a pulsed electric signal.

As shown in FIG. 3, the reduced image 1001 of the thin-line illuminated area 1000 is formed on each of the m×n blocks 1151 constituting the parallel photon counting sensor 115. The m×n reduced images 1001 are formed by the imaging lens 114 dividing the light flux. An upper half of the reduced image 1001 is detected by the photodetector element 1152A while a lower half thereof is detected by the photodetector element 1152B. In this embodiment, m×n photodetector elements 1152A located on the upper sides in the blocks 1151 are referred to as "channel 1", while m×n photodetector elements 1152B located on the lower sides in the blocks 1151 are referred to as "channel 2". A total value (count value of photons) of the pulsed electric signals generated in the m×n photodetector elements 1152 constituting the corresponding channels is outputted as an output from the respective channels.

According to the embodiment as just described, one thin-line illuminated area 1000 is divided into a plurality of (i.e., m×n) reduced images 1001 and the number of photons corresponding to the reduced images is concurrently counted up. Namely, the embodiment is capable of detection of weak light for the purpose of detecting the quantity of scattered light. As a result, the embodiment can achieve the detection of minute defects or enhance the sensitivity for defect detection. Incidentally, if the number of channels is further increased (device converted to a multichannel system), less background light is detected, resulting in further enhanced sensitivity for defect detection.

Figure 4:
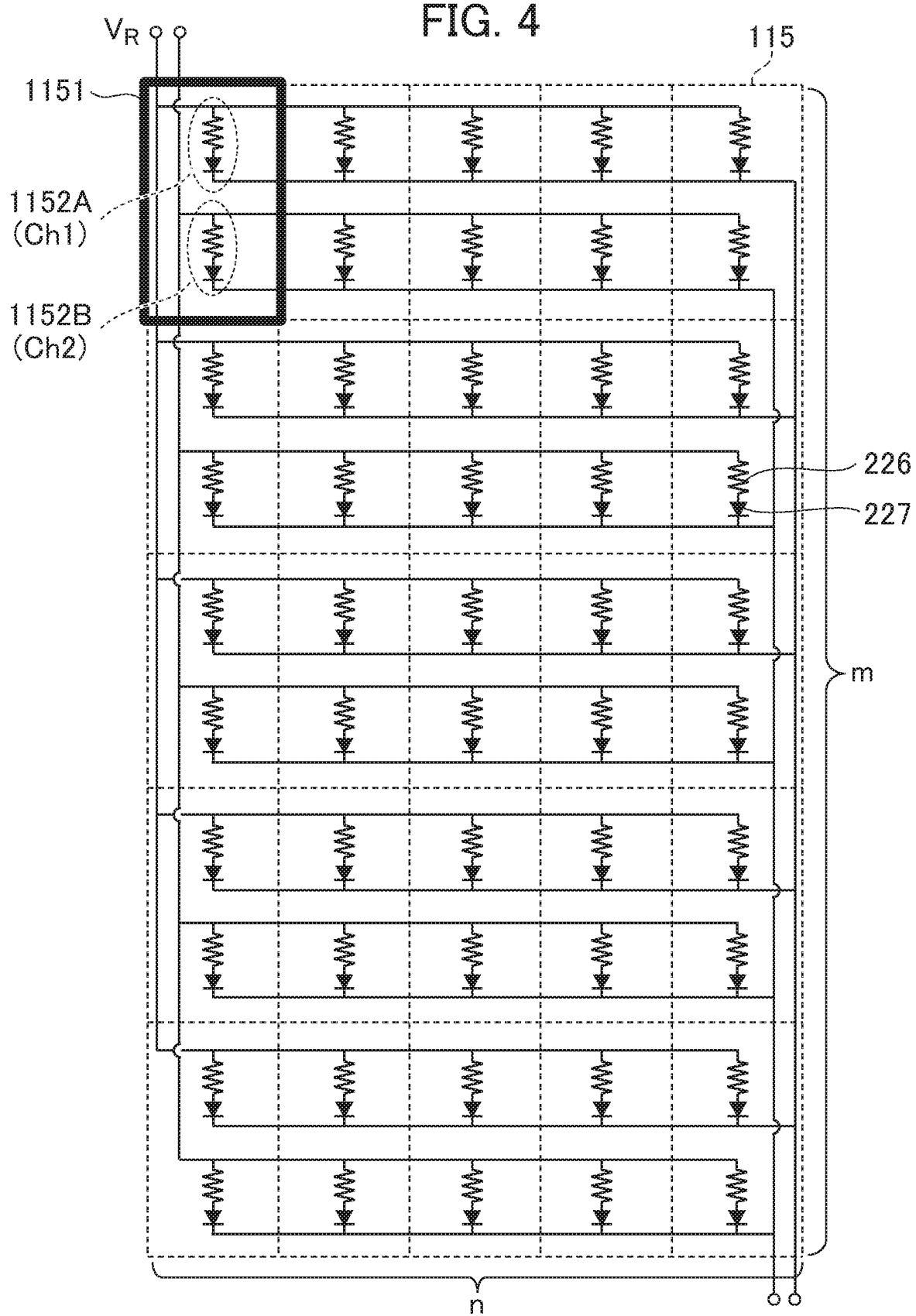
FIG. 4 is a diagram illustrating equivalent circuits of the parallel photon counting sensor.

FIG. 4 shows an equivalent circuit of the parallel photon counting sensor 115. In the figure, an area surrounded by a black border is the block 1151. A series circuit including a quenching resistance 226 and an avalanche photodiode 227 corresponds to the photodetector element 1152A, 1152B, respectively. An inverse voltage $V_R$ is applied to the respective avalanche photodiodes 227. The avalanche photodiode 227 can be operated in Geiger mode by setting the inverse voltage $V_R$ to not less than a breakdown voltage of the avalanche photodiode 227. Cathode electrodes of the avalanche photodiodes belonging to the same channel are connected to one output terminal. Thus, output electric signals (voltage, crest value of current or charge quantity) proportional to the number of photons incident on the m×n blocks 1151 are outputted on a per-channel basis. The output electric signals are analog signals which are outputted in parallel as time-series digital signals by unillustrated A/D conversion circuits.

Even though a plurality of photons are incident in a short time, the respective avalanche photodiode 227 only outputs a pulse signal of an intensity comparable to that of a signal when one photon is incident. Therefore, the output signal is saturated if the number of photons incident on the respective avalanche photodiode 227 per unit time increases (for example, not less than a specific quantity of light (an average quantity of incident light on one element per unit time is on the order of one photon) is incident on all the avalanche photodiodes 227 of one channel).

This embodiment is adapted to reduce the quantity of incident light per pixel by arranging m×n avalanche photodiodes 227 in two lines (two channels). Hence, the embodiment is capable of a more accurate photon counting. Assumed that m×n blocks are 1024 blocks (=32 rows and 32 columns) and that the avalanche photodiode 227 has a quantum efficiency of 30%, a sufficient linearity can be secured at a light intensity of about 1000 photons or less per unit detection time. Hence, light at intensity of 3300 photons or less can be detected without saturation.

(2-3-2) Stage Unit

As described above, the stage unit 13 includes: the translational stage 130; the rotary stage 131; and the Z-stage 132 for height adjustment of wafer surface. Now referring to FIG. 5 and FIG. 6, description is made on how the overall surface area of the wafer 5 is scanned with the thin-line illuminated area 1000 by way of the rotational and translational motions of the stage unit 13.

Figure 5:
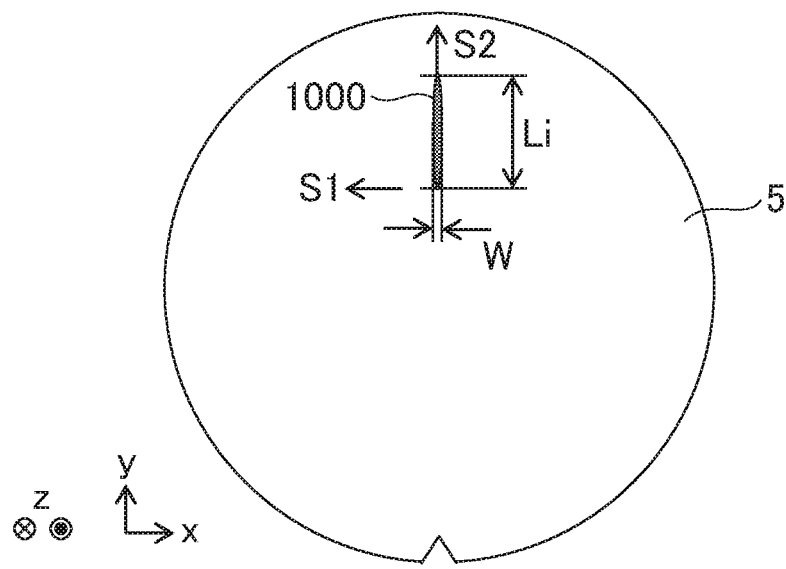
FIG. 5 is a diagram illustrating various factors of a thin-line illuminated area formed on a wafer surface.

As shown in FIG. 5, the thin-line illuminated area 1000 is formed on the surface of the wafer 5 by the illuminating optical system unit 10 (FIG. 1). It is noted here that the longitudinal direction of the thin-line illuminated area 1000 is referred to as S2 and a direction substantially perpendicular to S2 is referred to as S1. When making a rotational motion, the rotary stage 131 rotates in a circumferential direction S1 of a circle about a rotational axis. Further, the rotary stage 131 is moved in a translational direction S2 by the translational motion of the translational stage 130. The translational direction S2 herein is the same as the longitudinal direction S2 of the thin-line illuminated area 1000.

Figure 6:
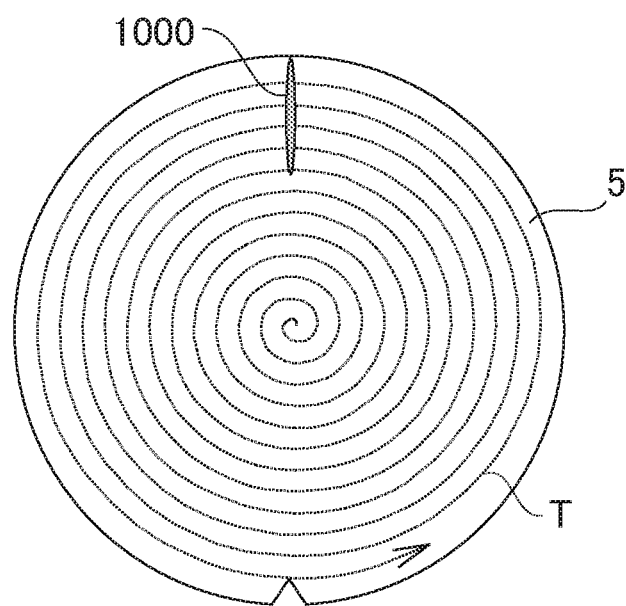
FIG. 6 is a diagram showing how the thin-line illuminated area is moved spirally.

While the wafer 5 is rotated through one revolution by the rotary stage 131 in the circumferential direction S1 (in a direction of the tangent to the circumference with respect to the thin-line illuminated area 1000), the translational stage 130 is moved by not more than a longitudinal length Li of the thin-line illuminated area 1000. As a result, an illumination spot (thin-line illuminated area 1000) scans the surface of the wafer 5 in a manner to draw a spiral locus on the wafer surface, as shown in FIG. 6. The overall surface area of the wafer 5 is scanned with the illumination spot (thin-line illuminated area 1000) by performing this scanning operation by a total length of the radius of the wafer 5 and the longitudinal length Li of the thin-line illuminated area 1000. This enables the inspection of the overall surface of the wafer 5.

The following description is made on a driving condition for the stage unit 13. This embodiment employs the surface inspection device 1 for inspecting the wafer 5 as a sample at high sensitivity and speed. The illuminating optical system unit 10 is adjusted such that the longitudinal length Li of the thin-line illuminated area 1000 for illuminating the surface of the wafer 5 is on the order of 200 μm. As shown in FIG. 1, each of the blocks 1151 of the parallel photon counting sensor 1151 includes four avalanche photodiodes arranged in the direction corresponding to the direction S2. Each of the avalanche photodiodes has 10 μm angle.

It is noted here, whereas the longitudinal length Li of the thin-line illuminated area 1000 is 200 μm, a dimension of the block 1151 is 40 μm. Therefore, an optical magnification of the illuminating optical system unit 10 has an optical magnification of ⅕. Each of the avalanche photodiodes constituting the block 1151 is equivalent to one detection channel. Accordingly, a pitch of the detection channel is 10 μm.

Under this condition, the stage unit 13 rotates the wafer 5 as the sample at a rotational speed of 4000 rpm, while translating the translational stage 130 at a feed pitch of 5 μm per revolution. In this case, the illumination light (thin-line illuminated area 1000) can scan the overall surface of the wafer 5 having a diameter of 300 mm in 7.5 seconds. In this embodiment, the feed pitch for the translational stage 130 per revolution of wafer while the thin-line illuminated area 1000 rotatingly scans the wafer surface 5 is set to ½ of the pitch (10 μm) of the detection channel. However, the feed pitch is not necessarily limited to this value. For example, the feed pitch of the translational stage 130 may be set to any value given by dividing the pitch of the detection channel by an even number or an odd number. Needless to say, the feed pitch for the translational stage 130 is not limited to integral divisions of the pitch of the detection channel but may be any given value.

(2-3-3) Signal Processing Unit

Figure 7:
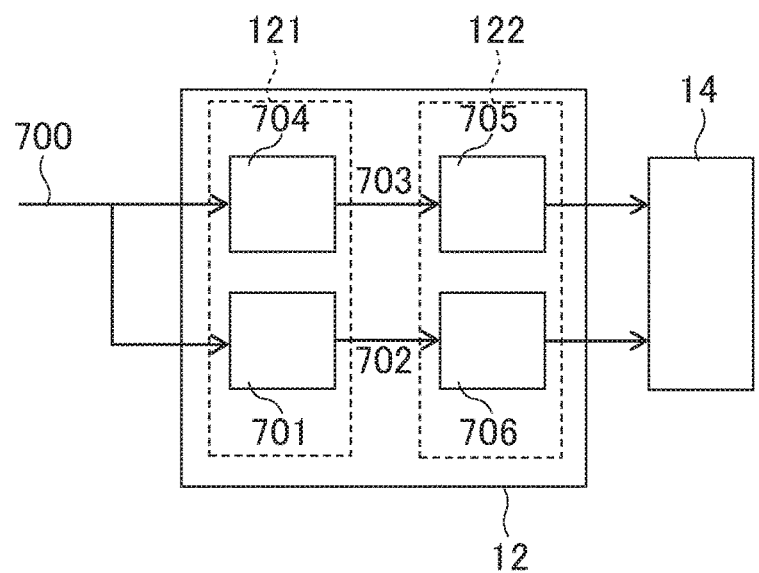
FIG. 7 is a diagram illustrating a configuration of a signal processing unit.

FIG. 7 shows an internal configuration of the signal processing unit 12. The signal processing unit 12 includes the filtering processor 121 and the signal processor/controller unit 122. Actually, a plurality of signals corresponding to the individual channels of the parallel photon counting sensor 115 are inputted to the signal processing unit 12. In the example of FIG. 1, four signals are inputted. FIG. 7 focuses on only an output signal from one channel (ch) for simplicity. Needless to say, the same processing is concurrently performed on the other channels (ch).

The parallel photon counting sensor 115 outputs an output signal 700 corresponding to the quantity of scattered light on a per channel (ch) basis. First, the output signal 700 is inputted to the filtering processor 121. The filtering processor 121 includes a low-pass filter 701 and a high-pass filter 104. The output signal 700 is inputted to the low-pass filter 701 and the high-pass filter 104.

As described above, the thin-line illuminated area 1000 is scanned in the width direction S1 thereof (circumferential direction of the wafer 5). Therefore, the waveform of a defect signal 703 represents the magnification/reduction of an illumination intensity distribution profile in the S1 direction of the thin-line illuminated area 1000. The high-pass filter 704 passes components of a frequency band containing a defect signal waveform, out of the output signal 700, while cutting off a frequency band containing relatively much noise and DC components. Thus, the high-pass filter 704 outputs to a defect determination portion 705 the defect signal 703 improved in S/N ratio.

The high-pass filter 704 may employ, for example: (1) a high-pass filter having a particular cutoff frequency and designed to cut off components of frequencies not lower than the particular frequency; (2) a band-pass filter; or (3) FIR (Finite Impulse Response) filter of a similar waveform to that of a defect signal reflecting the illumination intensity distribution profile of the thin-line illuminated area 1000.

The defect determination portion 705 of the signal processor/controller unit 122 determines whether or not the defect exists by performing threshold processing on the defect signal 703 inputted from the high-pass filter 704. In a case where more than one detecting optical system unit 11 exists, more than one defect signal 703 corresponding to the more than one detecting optical system unit 11 is inputted to the defect determination portion 705. In this case, the defect determination portion 705 performs, for example, (1) the threshold processing on a sum signal or weighted average signal of plural defect signals 703, or (2) performing a logical OR operation or logical AND operation on a group of defects extracted by the threshold processing of the plural defect signals 703 so as to determine a logical sum or logical product on the basis of the same coordinate system defined on the surface of the wafer 5. By performing these operations, the defect determination portion 705 receiving the plural defect signals 703 can accomplish the defect inspection at higher sensitivity than a case where a defect inspection is performed based on only one defect signal 703.

Regarding an area determined to sustain some defect, the defect determination portion 705 provides defect information to the general control unit 14, the defect information including defect coordinates indicating a defect location in the wafer as calculated based on a defect waveform and a sensitivity information signal, and an estimated value of a defect size. The general control unit 14 outputs the defect information to a display unit and the like. The defect determination portion 705 calculates the defect coordinates based on a gravity center of the defect waveform. The defect size is calculated on the basis of the integrated value or the maximum value of the defect waveform.

As described above, the output signal 700 is also inputted to the low-pass filter 701. The low-pass filter 701 extracts, from the output signal 700, low-frequency components and DC components corresponding to the quantity (haze) of scattered light from minute roughness in the thin-line illuminated area 1000 on the wafer 5, and outputs the extracted components as an output signal 702. The output signal 702 is inputted to a haze processing portion 706 of the signal processor/controller unit 122. The haze processing portion 706 processes haze information of the output signal 702. According to the magnitude of the output signal 702, the haze processing portion 706 outputs a signal, as a haze signal, which corresponds to a haze rate of every area on the wafer 5. The signal processing unit can also obtain information on a surface condition of the wafer 5 by processing the information acquired from the haze signal.

(2-4) Relation Between Pixels of Parallel Photon Counting Sensor 115 and Thin-Line Illuminated Area 1000

Figure 8A:
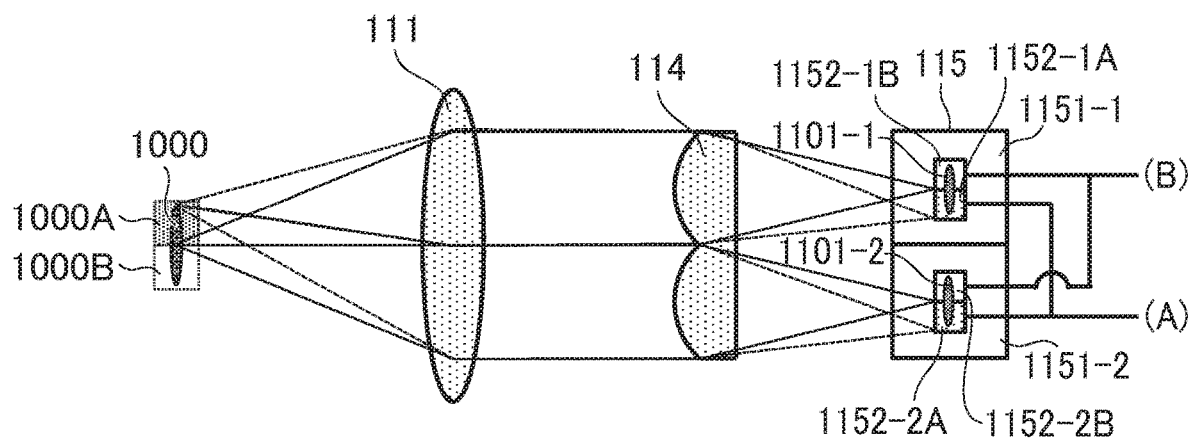
FIG. 8A is a diagram illustrating a relation between the pixels of the parallel photon counting sensor and the thin-line illuminated area.
Figure 8B:
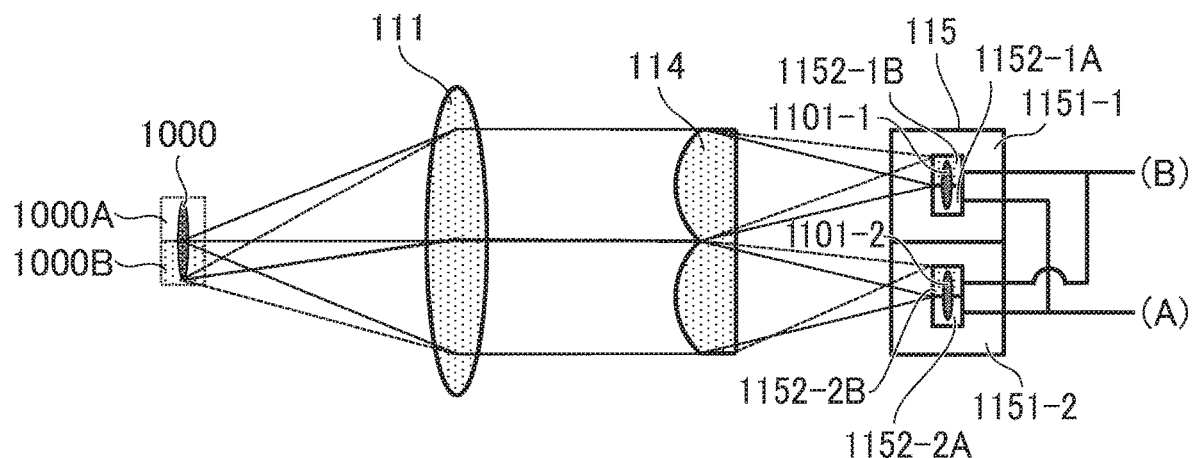
FIG. 8B is a diagram illustrating the relation between the pixels of the parallel photon counting sensor and the thin-line illuminated area.
Figure 8C:
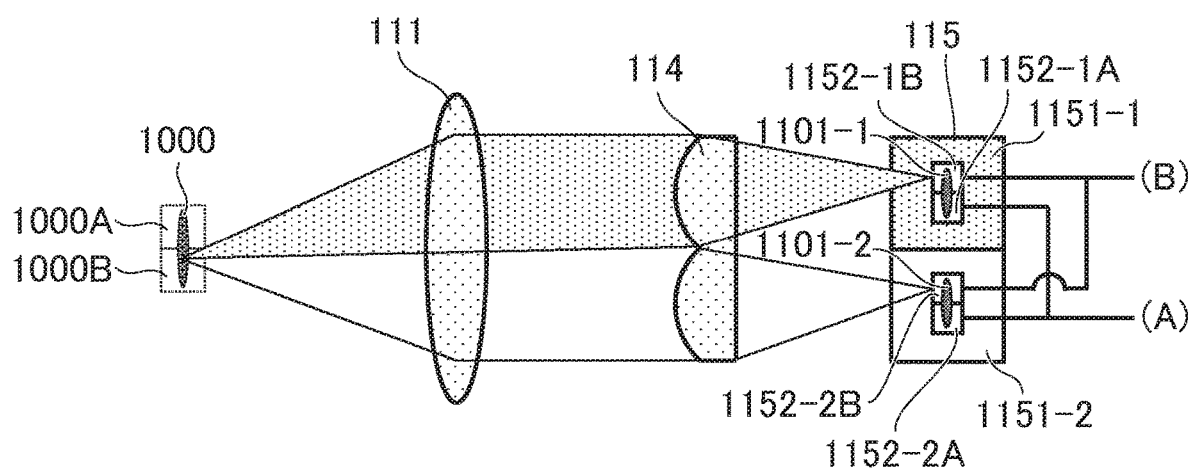
FIG. 8C is a diagram illustrating the relation between the pixels of the parallel photon counting sensor and the thin-line illuminated area.

Now referring to FIG. 8A to FIG. 8C, description is made on a relation between the pixels (photodetector elements 1152) of the parallel photon counting sensor 115 and the illuminated area 1000 which illuminates the wafer 5 as an inspection object. This embodiment employs an image forming optical system (imaging lens 114) as the detecting optical system and hence, the individual pixels (photodetector elements 1152) of the parallel photon counting sensor 115 can be associated with the position of the thin-line illuminated area 1000. Assuming that the scattered light is emitted from a location 1000A in the thin-line illuminated area 1000, as shown in FIG. 8A, the reduced images thereof 1001-1 and 1001-2 are detected by pixels 1152-1A and 1152-2A. Further, assumed that the scattered light is emitted from a location 1000B in the thin-line illuminated area 1000, as shown in FIG. 8B, the reduced images thereof are detected by pixels 1152-1B and 1152-2B. At this time, the background scattered light attributable to the roughness and the like of the wafer surface produce detection noises. This detection noise occurs on the overall area of the illuminated area. Namely, the reduced images 1001-1 and 1001-2 of the illuminated area defines a region of the background light noises. On the other hand, the scattered light from the defect to be detected occurs at one place where the defect exists. That is, per-pixel background light noise of the detector can be reduced by dividing the image of the illuminated area as suggested by this embodiment. As a result, the S/N ratio of defect detection can be improved.

As shown in FIG. 8C, the scattered light is detected by either a block 1151-1 or a block 1151-2 depending upon an angle at which the scattered light is emitted. The sum of pulses detected by the individual pixels of the respective blocks is equivalent to the number of detected photons, which gives a defect signal A or B.

Figure 9:
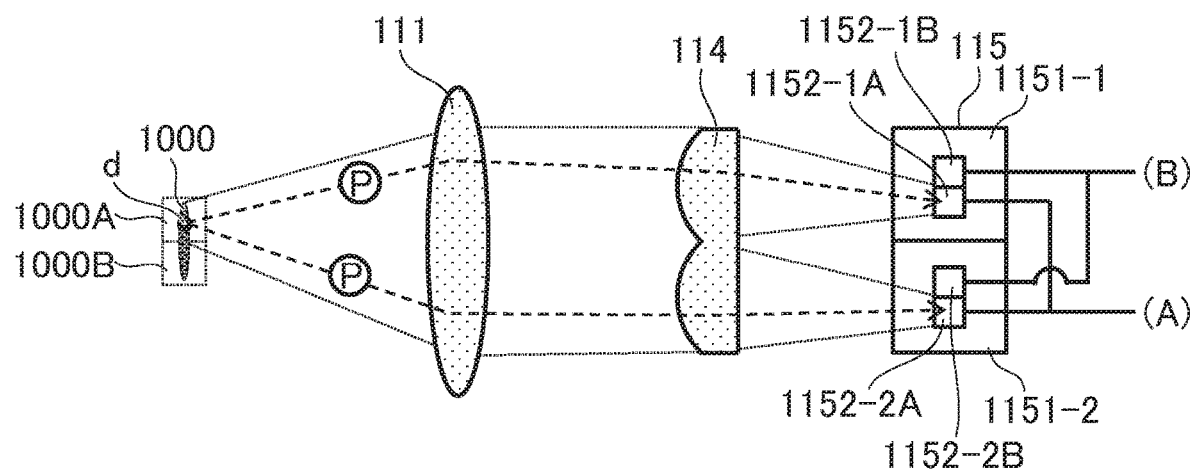
FIG. 9 is a diagram showing a detection operation in a case where a defect d exists in the thin-line illuminated area.

FIG. 9 illustrates a detection operation when a defect d exists in the thin-line illuminated area 1000. It is noted here that the rotational speed of the stage during the inspection is 4000 rpm, the width of an illumination line W of the thin-line illuminated area 1000 is 5 μm, and the diameter of the wafer 5 as the inspection object is 300 mm. In this case, the wafer 5 is r-θ scanned at the maximum linear speed VL=20000 mm/sec. Therefore, the time that the thin-line illuminated area 1000 needs to cross the defect d in the width direction thereof is W/VL=250 nsec.

It is desirable that the parallel photon counting sensor 115 performs more than one sampling while the thin-line illuminated area 1000 crosses the defect d. If the parallel photon counting sensor 115 operates at a sampling frequency of 20 MHz, for example, it takes 50 nsec for one sampling. The scattered light emitted from a nanometer-sized defect d in time on the order of nanoseconds is at such a level that the photons are discretely released. As described with reference to FIG. 8C, the scattered light (photon: P) from the defect d is detected by either the block 1151-1 or 1151-2 of the parallel photon counting sensor 115 depending upon the light emission angle. Further, depending upon the location 1000A or 1000B of the defect d relative to the thin-line illuminated area 1000, the scattered light from the defect d is detected by pixels 1151-1A and 1151-2A of the A channel or pixels 1151-1B and 1151-2B of the B channel of the parallel photon counting sensor 115. The defect signal A or B is obtained by calculating the sum of the photons detected by the respective blocks.

While FIG. 8A to FIG. 8C illustrate for simplicity the parallel photon counting sensor 115 which includes two blocks, each block including two pixels, the sensor for practical use actually needs a larger number of blocks and a larger number of pixels.

The number of photons of the scattered light from the defect significantly varies depending upon the size of the defect. The surface inspection device 1 is required to output the size of the detected defect as information and hence, needs to acquire information on the defect size on the basis of the number of detected photons. Namely, the device must count up even a large number of photons P released from a large defect d. It is therefore desirable in practical terms that the number of blocks of the parallel photon counting sensor 115 is, for example, 40×40=1600 or more. It is also desirable in practical terms that the number of detector pixels is any number not less than two that varies depending upon required detection sensitivity and inspection throughput. The increase in the number of detector pixels is effective at enhancing the detection sensitivity for the following reason. If the thin-line illuminated area 1000 is formed in the maximum possible length and at such a lighting energy density as not to damage the sample while the number of pixels is increased accordingly, scanning of the wafer 5 permits the same defect to be detected multiple times according to the number of pixels. The intensity of the defect signal is increased by n times by an n-pixel sensor performing addition n-times. On the other hand, the scattered light noise from the sample surface is multiplied by $\sqrt{n}$. Accordingly, the detection sensitivity can be increased by $\sqrt{n}$ times. Namely, the sensitivity is increased two-fold by configuring the four-pixel detector and performing addition four times.

(2-5) Effects of Embodiment

The surface inspection device 1 of the embodiment uses the reduced image of the illuminated area so that a large intersection angle can be formed between the image plane of the reduced image 1001 and the optical axis 110 of the detecting optical system unit 11. This facilitates the placement of the parallel photon counting sensor 115 and the detection of the reduced image 1001. In this embodiment, the reduced image 1001 itself is not observed but an incident position of the scattered light increased in quantity due to the minute defect (flaw) is detected as a position (channel) of the plural photodetector elements 1152 constituting each block 1151. Therefore, the embodiment can detect the presence of the minute defect (flaw) as well as the reduced image 1001 without using an imaging element enhanced in resolution.

This embodiment uses the reduced image 1001 for detection and hence, the thin-line illuminated area 1000 can be formed in a relatively large size. Therefore, the length of time required for the inspection of the wafer 5 can be reduced from that required by a conventional device. In this the embodiment, the longitudinal length of the thin-line illuminated area 1000 is 200 μm, and the size of each of the photodetector elements 1152 constituting the block 1151 is 10 μm. This permits the device having a resolution of 50 μm to detect the minute defects.

(3) Second Embodiment

Figure 10:
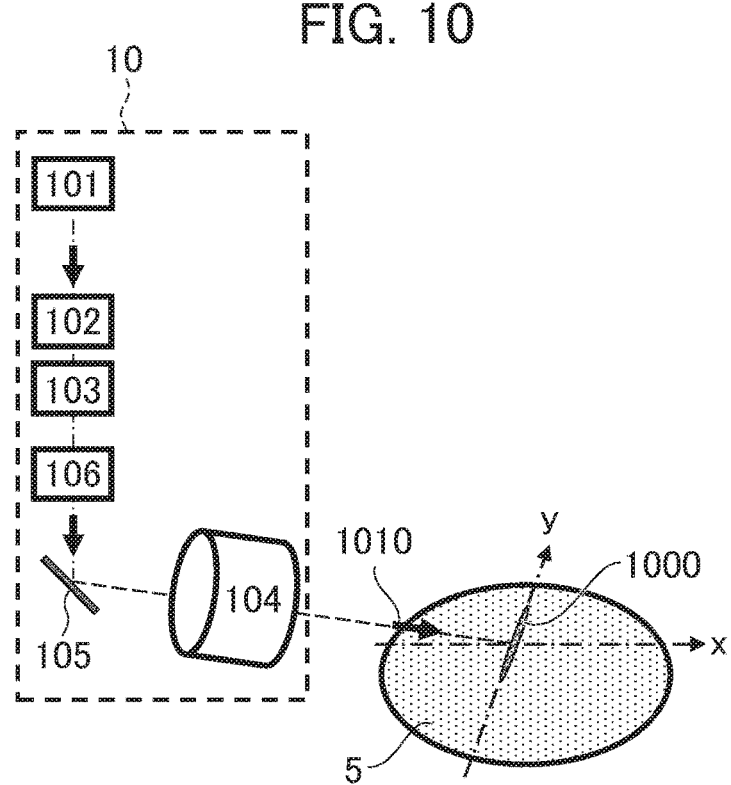
FIG. 10 is a diagram illustrating an illuminating optical system unit 10 according to a second embodiment.
Figure 11A:
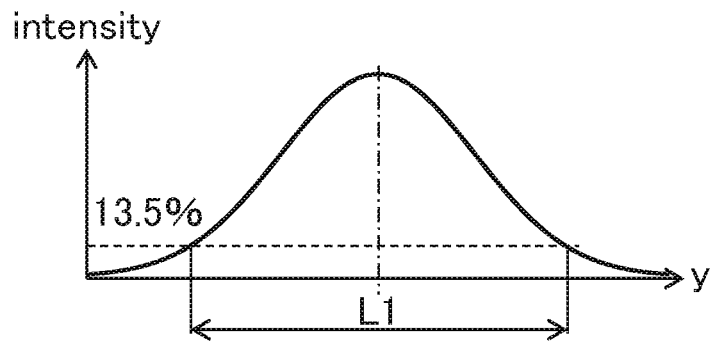
FIGS. 11A to 11D are graphs illustrating the function of an illumination intensity distribution controller 106.
Figure 11B:
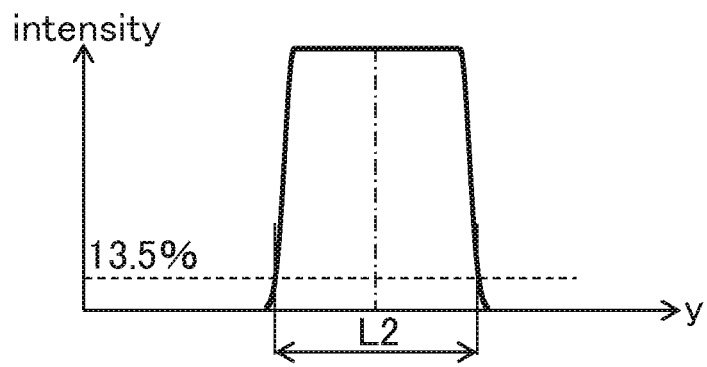
Figure 11C:
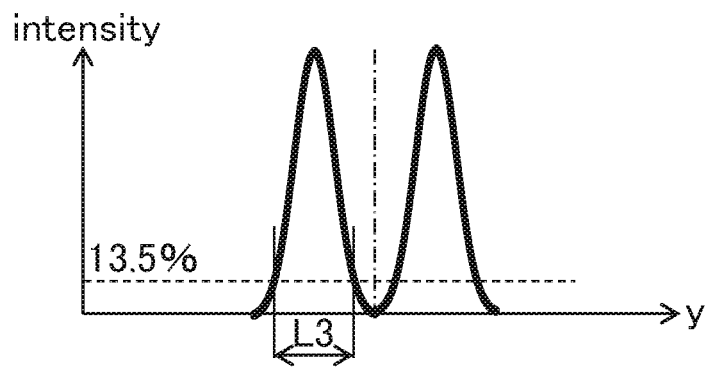
Figure 11D:
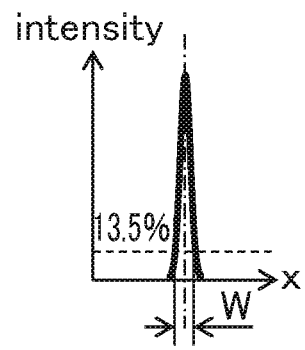

Next, description is made on another embodiment of the surface inspection device 1. The basic configuration of this embodiment is the same as that of the first embodiment. The following description is made exclusively on different components from those of the first embodiment. FIG. 10 illustrates an exemplary configuration of the illuminating optical system unit 10 employed by this embodiment. In FIG. 10, like reference numerals refer to the corresponding parts.

An illuminating optical system unit 10 shown in FIG. 10 has a structure wherein an illumination intensity distribution controller 106 is added to the structure of the illuminating optical system unit 10 shown in FIG. 1. The illumination intensity distribution controller 106 is disposed on an optical path between the beam shaping unit 103 and the mirror 105. The illumination intensity distribution controller 106 includes an optical element affecting phase distribution and intensity distribution of incident light. For example, a diffractive Optical Element (DOE) is employed as this optical element.

The diffractive optical element includes a substrate made of a material transparent to the incident light and is formed with a minute undulation on the surface of the substrate. The undulation has a dimension equal to or less than the wavelength of light. A material transparent to an ultraviolet light includes fused quartz. It is desirable to coat an element surface with an antireflection film for the purpose of suppressing the attenuation of light penetrating the diffractive optical element. A lithography technique is used for forming the minute undulation on the element surface.

The illumination intensity distribution on the sample surface can be controlled by permitting subparallel light having passed through the beam shaping unit 103 to pass through the diffractive optical element (illumination intensity distribution controller 106). The undulation on the diffractive optical element is designed based on calculation using Fourier Optics Theory so as to obtain a desired illumination intensity distribution on the sample surface and then, is fabricated accordingly. It is noted, however, that the illumination intensity distribution controller 106 need not necessarily be composed of the diffractive optical element but an alternative optical element having an equivalent function (aspherical lens, cylindrical lens array, light pipe and the like) is usable.

Now, description is made on the function of the illumination intensity distribution controller 106 with reference to FIG. 11. FIG. 11(*a*) shows an illumination intensity distribution of the thin-line illuminated area 1000 in a case (the first embodiment) where the illumination intensity distribution controller 106 is not provided. In this case, an illumination intensity distribution on the sample surface exhibits a Gaussian distribution having a length L1 of tens to hundreds micrometers in the y-direction (the longitudinal direction of the thin-line illuminated area 1000), reflecting an intensity distribution at the cross-section of laser beam of the light source. Incidentally, FIG. 11(*d*) shows an illumination intensity distribution in the x-direction (width direction of the thin-line illuminated area 1000). The distribution has a small width won the order of several micrometers. The length L1 and the width w of the thin-line illuminated area 1000 are defined to be determined at a position where the illumination intensity is 13.5% ($1/e^2$) of the peak value.

FIG. 11(*b*) shows an example of the illumination intensity distribution of the thin-line illuminated area 1000 in a case where the illumination intensity distribution controller 106 of this embodiment is used. In this example, the illumination intensity distribution in the y-direction of the thin-line illuminated area 1000 exhibits a substantially flat line and a length in the y-direction is tens to hundreds micrometers. Here, the width w of the thin-line illuminated area 1000 is the same as that of FIG. 11(*d*).

FIG. 11(*c*) shows another example of the illumination intensity distribution of the thin-line illuminated area 1000 in a case where the illumination intensity distribution controller 106 of this embodiment is used. In this case, the illumination intensity distribution of the thin-line illuminated area 1000 in the y-direction of the thin-line illuminated area 1000 includes plural spots having a length L3 of tens micrometers. Here, the width w of the thin-line illuminated area 1000 is the same as that of FIG. 11(*d*). In this case, the number of the spots is equalized with the number of pixels constituting the block 1151. As described above, the use of the illumination intensity distribution controller 106 provides a free adjustment of the illumination intensity distribution of the thin-line illuminated area 1000.

Figure 12A:
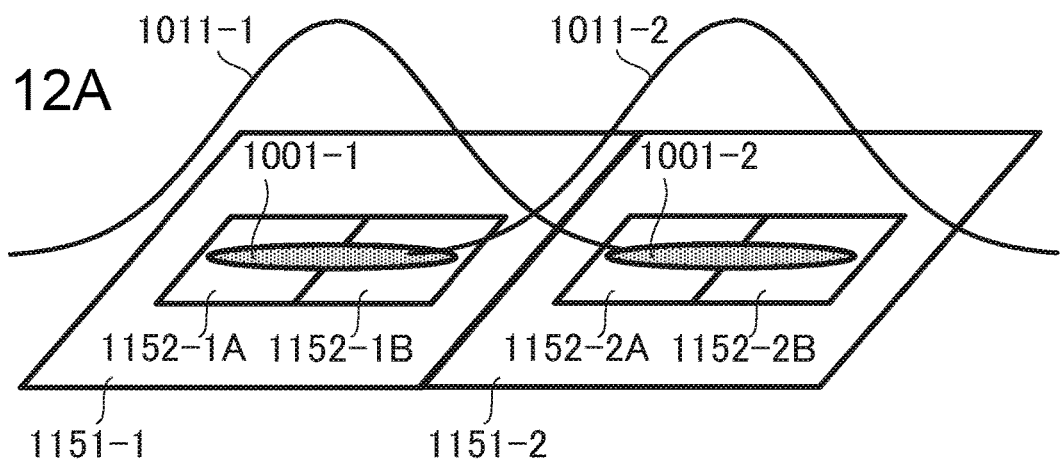
FIGS. 12A to 12C are diagrams illustrating a technical effect produced by the illumination intensity distribution controller 106.
Figure 12B:
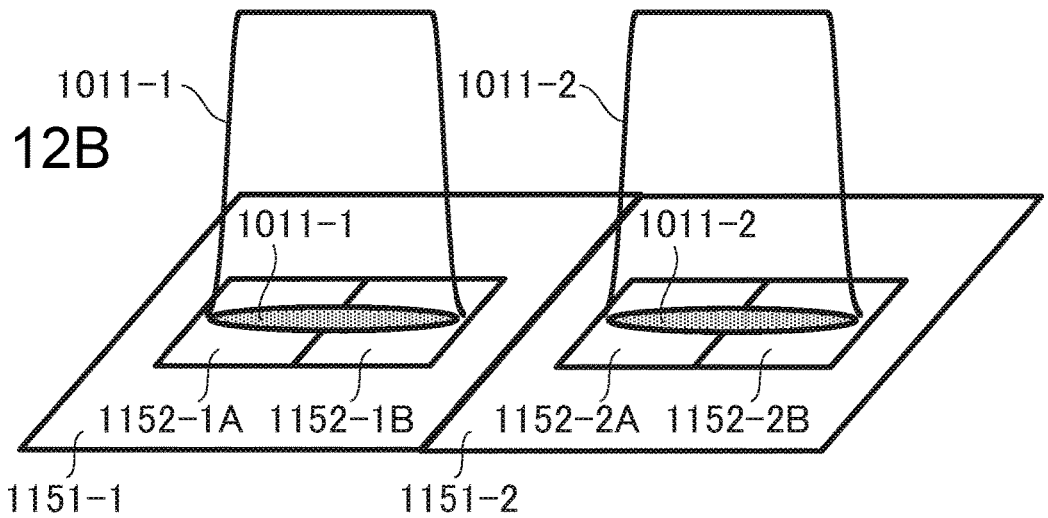
Figure 12C:
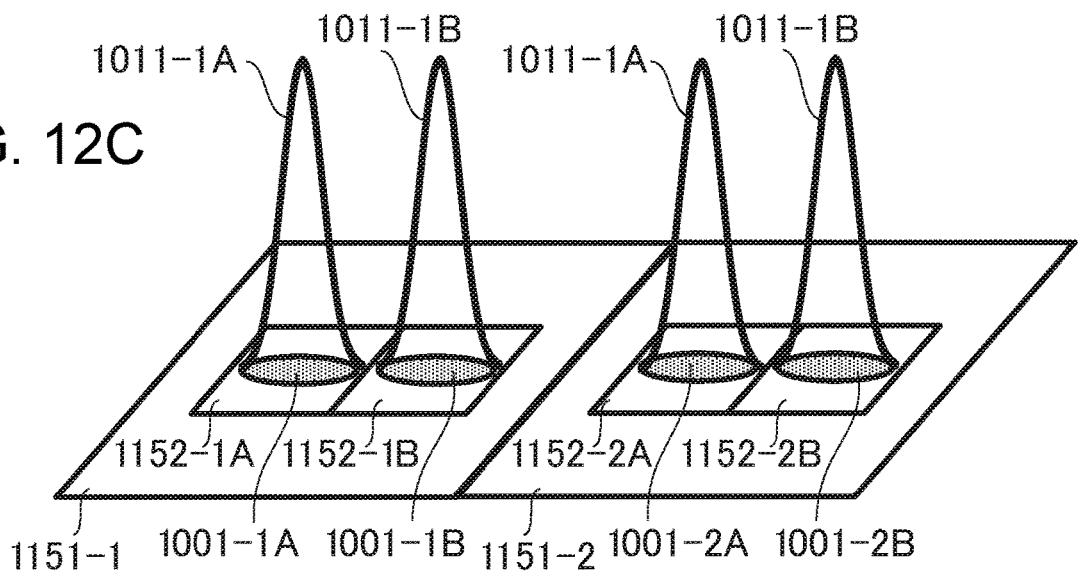

Now referring to FIG. 12, description is made on technical effects delivered by the illumination intensity distribution controller 106. FIG. 12(*a*) shows a relation between the illumination intensity distribution of the reduced image and the pixel of the parallel photon counting sensor 115 in the case (the first embodiment) where the illumination intensity distribution controller 106 is not provided. As shown in FIG. 12(*a*), illumination intensity distributions 1011-1 and 1011-2 of the reduced images 1001-1 and 1001-2 exhibit Gaussian distributions in the longitudinal direction thereof. Hence, the illumination intensity of the reduced images 1001-1 and 1001-2 is decreased at ends of the pixels (photodetector elements 1152-1A, 1152-1B, 1152-2A, 1152-2B). This results in the decrease in sensitivity.

If it is intended to increase the illumination intensity at the end of the pixel without using the illumination intensity distribution controller 106, the tail of the Gaussian distribution spreads into an adjoining block, causing crosstalk. The occurrence of crosstalk may lead to false detection of defect. In a case where a major defect passes through an end of the illuminated area, for example, the defect is detected by a pixel other than a pixel intrinsically meant to detect the defect.

FIG. 12(*b*) shows a relation between the illumination intensity distribution of the reduced image and the pixel of the parallel photon counting sensor 115 in the case of using an illumination intensity distribution controller 106 conditioned such that the illumination intensity distribution of the thin-line illuminated area 1000 in the longitudinal direction thereof exhibits the shape shown in FIG. 11(*b*). In this case, the illumination intensity distributions 1011-1 and 1011-2 of the reduced images 1001-1 and 1001-2 are flat shaped and have short tails at the end of the illuminated area. This is effective to suppress the sensitivity decrease at the end of the pixels (photodetector elements 1152-1A, 1152-1B, 1152-2A, 1152-2B) and also to reduce crosstalk.

FIG. 12(*c*) shows a relation between the illumination intensity distribution of the reduced image and the pixel of the parallel photon counting sensor 115 in the case of using an illumination intensity distribution controller 106 conditioned such that the illumination intensity distribution of the thin-line illuminated area 1000 in the longitudinal direction thereof exhibits the shape shown in FIG. 11(*c*). In this case, the spots of the illumination intensity distributions 1011-1 and 1011-2 corresponding to the reduced images 1001-1 and 1001-2 are located within the pixels, respectively. This is effective to suppress the crosstalk maximally and to avoid a dead zone present between the pixels of the detector, resulting in an effective use of laser power.

(4) Other Embodiments

In the foregoing embodiments, the description is made on the case where the imaging lens 114 essentially includes the microlens array only for illustrative purpose but the present invention is not limited to this configuration. The microlens array can be described as an image forming element including a lens group that has divided apertures of the detecting optical system unit 11 and is configured to form a plurality of images. The aperture may sometimes be expressed as "NA: Numerical Aperture" or discussed as scatter angle based on the normal line of the sample.

While the foregoing embodiments illustrate the case where the detecting optical unit 11 is a reduction system and rhombic detection system, the present invention need not necessarily be the reduction system or the rhombic detection system. Configuring the detecting optical unit 11 as a magnifying system, placing the detecting optical unit 11 in a manner to include the normal line of the sample, and arranging the plural detecting optical units 11 are construed as being included in the scope of disclosure contained in the description.

The detector exemplified by the parallel photon counting sensor 115 in the foregoing embodiments is also applicable to other purposes than the inspection device. Such a detector can be described as one that detects the signal from the sample and includes a plurality of partitions arranged in matrix, and the partition includes a first pixel and a second pixel.

REFERENCE SIGNS LIST

1: surface inspection device
5: wafer
10: illuminating optical system unit
11: detecting optical system unit
12: signal processing unit
13: stage unit
14: general control unit
101: light source
102: polarization state controller
103: beam shaping unit
104: thin-line converging optical system
105: mirror
110: optical axis of detecting optical system unit
111: objective lens
112: aperture control filter
113: polarization filter
114: imaging lens
115: parallel photon counting sensor
226: quenching resistance
227: avalanche photodiode
700: output signal
701: low-pass filter
702: output signal
703: defect signal
704: high-pass filter
705: defect determination portion
706: haze processing unit
1000: thin-line illuminated area
1001: reduced image
1151: block
1152, 1152A, 1152B: photodetector element

The invention claimed is:

1. An inspection device comprising:
an illuminating optical system for forming an illuminated area having a longitudinal direction on a sample;
a detecting optical system for converging light from the sample; and
a detector having an arrangement of partitions each including at least a first photodetector element and a second photodetector element,
wherein
the detecting optical system is disposed such that an optical axis thereof is inclined with respect to a direction of a normal line of a surface of the sample,
the detecting optical system is a reducing optical system having an imaging magnification of less than 1,
the detecting optical system includes an image forming element including a lens group, the lens group having divided apertures and being configured to form a plurality of images of the illuminated area on the detector, and
each of the plurality of images formed on the detector is formed across the first photodetector element and the second photodetector element.

2. The inspection device according to claim 1,
wherein each of the first photodetector element and the second photodetector element includes an avalanche photodiode,
the avalanche photodiode of the first photodetector element is connected with a first quenching resistance, and
the avalanche photodiode of the second photodetector element is connected with a second quenching resistance.

3. The inspection device according to claim 2, further comprising a signal processing unit for performing defect detection processing on each of a first signal and a second signal outputted from the first photodetector element and the second photodetector element operating in Geiger mode.

4. The inspection device according to claim 3,
wherein the image forming element is a microlens array.

5. The inspection device according to claim 4,
wherein the reducing optical system is disposed obliquely to the sample.

6. The inspection device according to claim 4,
wherein the number of the partitions is substantially the same as that of microlenses constituting the microlens array.

7. The inspection device according to claim 6,
wherein the size of the partition is substantially the same as that of the microlens.

8. The inspection device according to claim 1, further comprising a signal processing unit for performing defect detection processing on each of a first signal outputted from the first photodetector element and a second signal outputted from the second photodetector element.

9. The inspection device according to claim 1,
wherein the image forming element is a microlens array, and
the number of the partitions is substantially the same as that of microlenses constituting the microlens array.

10. The inspection device according to claim 1,
wherein the image forming element is a microlens array, and
the size of the partition is substantially the same as that of a microlens constituting the microlens array.

11. The inspection device according to claim 1,
wherein the illuminated area is formed in an illumination intensity distribution exhibiting a Gaussian distribution in the longitudinal direction.

12. The inspection device according to claim 1, wherein the illuminated area is formed in an illumination intensity distribution exhibiting a flat line in the longitudinal direction.

13. The inspection device according to claim 1, wherein the illuminated area is formed in an illumination intensity distribution including plural spots in the longitudinal direction.

* * * * *